Feb. 17, 1953
R. C. STELMACH
2,628,549
VENTILATOR AND SUN SHIELD
Filed Dec. 10, 1948
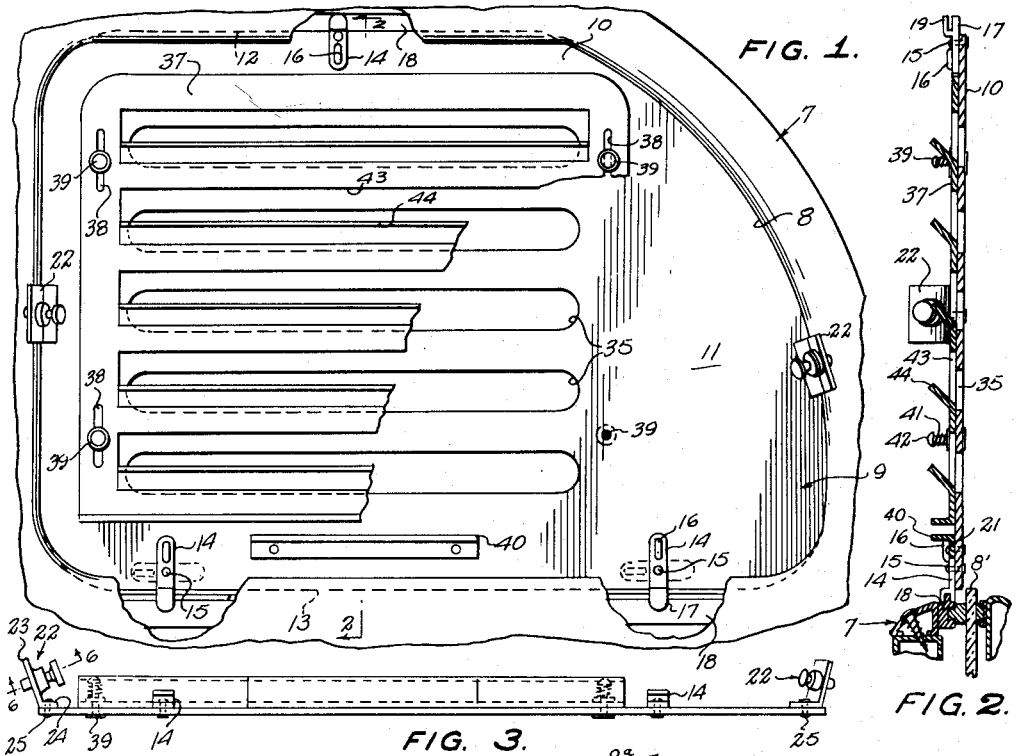
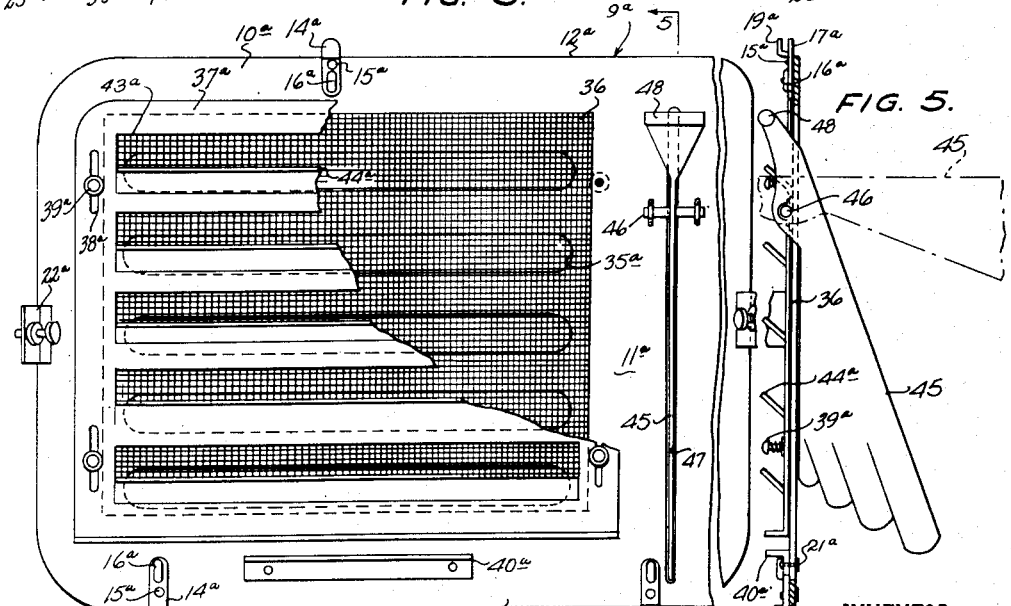
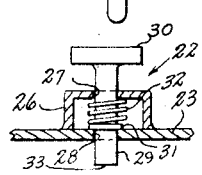
INVENTOR.
RAYMOND C. STELMACH,
BY
ATTORNEYS Patented Feb. 17, 1953

2,628,549

UNITED STATES PATENT OFFICE 2,628,549

VENTILATOR AND SUN SHIELD

Raymond C. Stelmach, Harvey, Ill.

Application December 10, 1948, Serial No. 64,665

4 Claims. (Cl. 98—2)

This invention relates generally to improvements in combined ventilators and sun shields for use in window openings, the primary object of the invention being to provide such a device in a practical and convenient form for removable installation which when installed provides ventilation, protection from the sun and rain, and unusual visibility, and in addition, provides sun-shielded, ventilated protection of the interior and contents of the room or other space, such as the interiors of automobiles, trucks, buses and the like from pilfering and from the weather.

Another important object of the invention is to provide a relatively inexpensive device of small mass and efficient construction easily adapted for installation in any window opening including those of different makes of cars, which combines features affording ventilation of the interior of a room or car along with shielding of the said interior from the sun, without material reduction of visibility for persons therein, whether, in the case of a car, the car is moving or is at a standstill, the said device being capable of being constructed in different sizes and shapes to fit different car window openings or other window openings.

Other important objects and advantageous features of the invention will be apparent from the following description taken in connection with the accompanying drawings, wherein, merely for present purposes of illustration, specific embodiments of the invention are set forth in detail.

In the drawings, wherein similar numerals designate corresponding parts throughout the several views—

Figure 1 is an inboard side elevation of an embodiment of the invention fitting a car window opening having a curved forward part.

Figure 2 is a transverse vertical section taken through Figure 1 on the line 2—2.

Figure 3 is a bottom plan view of Figure 1.

Figure 4 is an inboard side elevation of another embodiment of the invention designed to fit a car window opening of different shape, at the driver's side of the car, the said embodiment incorporating a screen, and a semaphore traffic signal device, in addition to the structure of the embodiment of Figure 1.

Figure 5 is a transverse vertical section taken through Figure 4 showing the semaphore signal device in depressed vertical position in full lines and in elevated horizontal position in dotted lines.

Figure 6 is an enlarged fragmentary sectional and elevational detail of one of the screw clamping brackets.

Referring in detail to the drawings, and first to Figures 1 to 3 thereof, the numeral 7 generally designates the frame around a motor vehicle window opening 8, into which the device of the invention, generally designated 9, is removably set. The device 9 comprises a main or back plate 10 of a size and contour to permit its edges to be set into place in the window opening 8. The plate 10 is preferably formed of transparent plastic material in whole or in part, providing a substantial area 11 at the forward end of the device affording unimpaired and unobstructed visibility. The plate 10 may be of material sufficiently flexible and springy around its edges to permit the edge portions to be bent or deflected to assume positions in the window opening. Or the plate 10 may be made rigid and so shaped as to be maneuverable into place in the window frame and held in position with fasteners or the like.

In either case, mounting means are provided on the back or inboard side of the upper edge 12 and lower edge 13 of the plate 10, consisting of flat spring fasteners 14 pivotally connected intermediate their ends to the plate 10 for movement about an axis transverse of the plate or pin 15. One end of the fasteners is formed to provide a convex-concave protrusion 16 serving as a finger grip and the other end 17 is plain and designed to extend beyond the edge of the plate 10 and project for a substantial distance into the window frame groove and engage over the inner molding strip 18, as indicated, for example in Figures 1 and 2. The other ends of the fasteners 14 may have lateral arms 19, curved into parallelism with the plain ends 17, the arm 19 and flat end 17 of each fastener constituting a means for embracingly engaging the upper edge of the molding strip 18, as indicated in Figure 1. In the embodiment illustrated in Figure 1, only one fastener is provided on the upper edge of the plate 10, and two longitudinally spaced fasteners are provided on its lower edge. However, any suitable number of end fasteners may be used. Rivet heads 21 are positioned for the means or convex-concave portions 16 of the fasteners to engage whereby the fasteners 14 are held in operative position or in their embracing engagement position.

Clamping means in addition to the fasteners 14 for securing the plate 10 in place so that it cannot be readily removed from the outside by unauthorized persons without damaging the same comprise clamping brackets 22, located on the front and rear edges of the plate for engaging the inboard side of corresponding portions of the window frame 7. Each clamping bracket comprises a bracket plate 23 having an angular flange 24 riveted or otherwise secured at 25 to the inboard side of the plate 10 with the bracket plate 23 projecting in an inboard direction and beyond the edge of the plate 10 at an angle of about 45°. Fixed on the bracket plate 23, as shown in Figure 6, is a hollow cylindrical member 26, the web of the member 26 and the plate 23 having aligned holes 27 and 28, respectively, through which extends the clamping bolt 29 which has the finger knob 30 and the fixed stop collar 31. A helical spring 32 is compressed between the web of the member 26 and the collar 31 to normally maintain the free end 33 of the bolt pressed against the inboard side of the window frame 7, the bolts of the two clamping arrangements acting in opposite directions to prevent longitudinal or horizontal shifting of the plate 10 in the window opening and acting angularly against the inboard side of the window frame so as to prevent the plate 10 from being removed outwardly from the window opening until the bolts 29 have been retracted. It will be observed that with the device arranged as shown in Figures 1 and 2, the window glass 8', which is at the outside of the plate 10, can be raised and lowered without interference with the device.

The plate 10 is formed with a desired number of longitudinal or horizontal, parallel spaced ventilating slots 35, extending forwardly from a point near the rear edge of the plate 10 to a point relatively greatly spaced rearwardly from the front edge of the plate 10, whereby the unobstructed, clear visibility area 11 is defined.

Slidably mounted on the inboard side of the plate 10 for vertical up and down movement relative to the plate 10 is the shutter or louver plate 37, which may, if desired be made of transparent material to provide maximum visibility through its area of the device, but is preferably formed of translucent material having sufficient opacity to shield out sunlight. The shutter plate 37 is formed in its front and rear marginal portions with vertical slots 38 through which headed rivets 39, anchored in the back plate 10, extend to hold the shutter slidably in place on the plate 10. A horizontal flange 40 secured to the inboard side of the plate 10 beneath the shutter plate 37, serves as a stop for the lower edge of the shutter plate in its lowermost position. Springs 41 are circumposed on the rivets 39 between their heads 42 and the shutter plate 37 to eliminate rattling and shifting of the shutter plate.

The shutter plate 37 is formed with ventilating slots 43 of substantially the same size and shape as the ventilating slots 35 of the back plate 10, which are registrable with the slots 35 of the back plate only in the lowermost position of the shutter plate. In intermediate and elevated positions of the shutter plate 37 the back plate slots are partially closed by portions of the shutter plate lying between the slots 35. The lower edges of the shutter plate slots 43 have upwardly angulated inboardly extending louvers 44, so arranged that in partially and fully registered positions of the slots in the two plates, that is, in the wide open ventilating position of the shutter plate 37 the louvers will prevent sunlight and rain from passing through the slots and entering the interior of the car.

Referring to Figures 4 and 5, the device of this form is designated by the numeral 9a and comprises a main or back plate 10a of a size and contour to permit its edges to be set into place in a vehicle window opening and having a substantial area 11a at the forward end affording unimpaired and unobstructed visibility. This plate is made of the same material and fabricated in the same manner as hereinabove set forth for the main plate 10 of the form of Figures 1 to 3. Mounting means are also provided on the back or inboard side of the upper edge 12a and lower edge 13a of the plate 10a, such means embodying flat spring fasteners 14a pivoted intermediate their ends to the plate 10a at 15a. One end of the fasteners is formed to provide a convex-concave protrusion 16a serving as finger grip and the other end 17a is plain and designed to extend beyond the edge of the plate 10a and project for a substantial distance into the window frame groove and engage over the adjacent molding strip. The other ends of the fasteners 14a have lateral arms 19a curved into parallelism with the plain end 17a, to provide for receiving therebetween the upper edge of the molding strip, as in the case of the form shown in Figures 1 to 3. In this form, only one fastener 14a is provided on the upper edge of the plate 10a and two longitudinally spaced fasteners are provided on its lower edge. Rivet heads 21a are positioned for the convex-concave portion 16a of the fasteners 14a to engage, whereby the fasteners are held in operative position. Clamping brackets 22a of the same structure as the bracket 22 of the form of Figures 1 to 3 are provided for securing the plate 10a in place so it cannot be readily removed from the outside by unauthorized persons without damaging the same.

The plate 10a is formed with a desired number of longitudinal or horizontal parallel spaced ventilating slots 35a, the slots being covered by a wire mesh screen 36 which is not present in the form of Figures 1 to 3 inclusive. These slots 35a extend forwardly from a point near the rear edge of the plate 10a to a point spaced from the front edge of the plate, whereby the unobstucted, clear visibility area 11a is defined.

Slidably mounted on the inboard side of the plate for vertical up and down movement relative to the plate is a shutter or louver plate 37a, fabricated of the same material as shutter plate 37. The shutter plate 37a is formed in its front and rear marginal portions with vertical slots 38a through which headed rivets 39a, anchored in the plate 10a, extend to hold the shutter plate slidably in place on the plate 10a. A horizontal flange 40a secured to the inboard side of the plate 10a beneath the shutter plate 37a, serves as a stop for the lower edge of the shutter plate in its lowermost position. The lower edges of the shutter plate slots 43a have upwardly angulated inboardly extending louvers 44a arranged in the same manner as louvers 44 of the form of Figures 1 to 3 inclusive.

A signalling semaphore 45 is mounted on a pivot 46 straddling the upper end of a vertical slot 47 in the clear area 11a of the plate 10a and is formed with a hand grip 48 on its inboard end adapted to be depressed by the driver to elevate the outboard part of the semaphore, as indicated in dotted lines in Figure 5.

The invention is susceptible of various changes in its form, proportions and minor details of construction, and the right is herein reserved to make such changes as properly fall within the scope of the appended claims.

What is claimed:

1. A ventilating and shielding device for mounting in the window opening of a vehicle window frame having a window glass comprising a main plate shaped to conform to said window opening and adapted to be positioned within said window frame in parallel spaced relation with respect to said window glass, there being a plurality of longitudinally extending slots arranged in aligned parallel spaced relation in said plate, said slots extending inwardly from a point adjacent one end of said plate and terminating at a point spaced from the other end of said plate, a shutter plate positioned in face to face relation with respect to said plate and connected to said main plate for vertical up and down movement, said shutter plate being provided with a plurality of longitudinally extending slots arranged in aligned parallel spaced relation, the slots of said shutter plate being registrable with the slots in said main plate upon down movement of said shutter plate, an upstanding louver arranged at an angle with respect to said shutter plate adjacent each of its slots and having the lower end secured to the lower longitudinal side edge of said adjacent slot, and a plurality of fasteners arranged in spaced relation along the boundary of said main plate and facing the same face which said shutter plate faces and each pivotally connected intermediate its ends to said main plate for movement about an axis transverse of said main plate, each fastener having means on one end embracingly engaging the adjacent portion of said window frame and having means on the other end bearing against the facing face of said main plate.

2. A ventilating and shielding device for mounting in the window opening of a vehicle window frame having a window glass comprising a main plate shaped to conform to said window opening and adapted to be positioned within said window frame in parallel spaced relation with respect to said window glass, there being a plurality of longitudinally extending slots arranged in aligned parallel spaced relation in said plate, said slots extending inwardly from a point adjacent one end of said plate and terminating at a point spaced from the other end of said plate, a shutter plate positioned in face to face relation with respect to said plate and connected to said main plate for vertical up and down movement, said shutter plate being provided with a plurality of longitudinally extending slots arranged in aligned parallel spaced relation, the slots of said shutter plate being registrable with the slots in said main plate upon down movement of said shutter plate, an upstanding louver arranged at an angle with respect to said shutter plate adjacent each of its slots and having the lower end secured to the lower longitudinal side edge of said adjacent slot, a plurality of fasteners arranged in spaced relation along the boundary of said main plate and facing the same face which said shutter plate faces and each pivotally connected intermediate its ends to said main plate for movement about an axis transverse of said main plate, each fastener having means on one end embracingly engaging the adjacent portion of said window frame and having means on the other end bearing against the facing face of said main plate, and stop means on said main plate and engageable with said shutter plate upon down movement of the latter to limit the down movement of said shutter plate.

3. A ventilating and shielding device for mounting in the window opening of a vehicle window frame having a window glass comprising a main plate shaped to conform to said window opening and adapted to be positioned within said window frame in parallel spaced relation with respect to said window glass, there being a plurality of longitudinally extending slots arranged in aligned parallel spaced relation in said plate, said slots extending inwardly from a point adjacent one end of said plate and terminating at a point spaced from the other end of said plate, a shutter plate positioned in face to face relation with respect to said plate and connected to said main plate for vertical up and down movement, said shutter plate being provided with a plurality of longitudinally extending slots arranged in aligned parallel spaced relation, the slots of said shutter plate being registrable with the slots in said main plate upon down movement of said shutter plate, an upstanding louver arranged at an angle with respect to said shutter plate adjacent each of its slots and having the lower end secured to the lower longitudinal side edge of said adjacent slot, a plurality of fasteners arranged in spaced relation along the boundary of said main plate and facing the same face which said shutter plate faces and each pivotally connected intermediate its ends to said main plate for movement about an axis transverse of said main plate, each fastener having means on one end embracingly engaging the adjacent portion of said window frame and having means on the other end bearing against the facing face of said main plate, and spaced clamping means carried by said main plate adjacent the boundary of the latter and engageable with the adjacent portion of said window frame for locking said main plate in place within said window frame.

4. A ventilating and shielding device for mounting in the window opening of a vehicle window frame having a window glass comprising a main plate shaped to conform to said window opening and adapted to be positioned within said window frame in parallel spaced relation with respect to said window glass, there being a plurality of longitudinally extending slots arranged in aligned parallel spaced relation in said plate, said slots extending inwardly from a point adjacent one end of said plate and terminating at a point spaced from the other end of said plate, a wire mesh screen fixedly positioned in face to face abutting relation with respect to said main plate and covering the slots in the latter, a shutter plate positioned in face to face relation with respect to said screen and connected to said main plate for vertical up and down movement, said shutter plate being provided with a plurality of longitudinally extending slots arranged in aligned parallel spaced relation, the slots of said shutter plate being registrable with the slots in said main plate upon down movement of said shutter plate, an upstanding louver arranged at an angle with respect to said shutter plate adjacent each of its slots and having the lower end secured to the lower longitudinal side edge of said adjacent slot, and a plurality of fasteners arranged in spaced relation along the boundary of said main plate and facing the same face which said shutter plate faces and each pivotally connected intermediate its ends to said main plate for movement about an axis transverse of said main plate, each fastener having means on one end embracingly engaging the adjacent portion of said window frame and having means on the other end bearing against the facing face of said main plate.

RAYMOND C. STELMACH.

REFERENCES CITED

The following references are of record in the file of this patent:

UNITED STATES PATENTS

| Number | Name | Date |
|---|---|---|
| 724,556 | Dodge | Apr. 7, 1903 |
| 949,600 | Rylander | Feb. 15, 1910 |
| 1,611,735 | Garland | Dec. 21, 1926 |
| 1,682,173 | Gaede | Aug. 28, 1928 |
| 1,751,768 | Stuart | Mar. 25, 1930 |
| 1,754,122 | Saunders | Apr. 8, 1930 |
| 1,787,637 | McNab | Jan. 6, 1931 |
| 1,797,915 | Hockstein | Mar. 24, 1931 |
| 1,830,691 | Bates | Nov. 3, 1931 |
| 1,837,135 | Pousha et al. | Dec. 15, 1931 |
| 1,852,898 | Rabourn | Apr. 5, 1932 |
| 2,028,827 | Cox | Jan. 28, 1936 |
| 2,094,427 | Dillon | Sept. 28, 1937 |
| 2,182,699 | Maxwell | Dec. 5, 1939 |
| 2,242,606 | Duncan | May 20, 1941 |
| 2,281,840 | Hamilton | May 5, 1942 |
| 2,388,747 | Kolarik | Nov. 13, 1945 |
| 2,476,901 | Oppatt | July 19, 1949 |

FOREIGN PATENTS

| Number | Country | Date |
|---|---|---|
| 204,701 | Great Britain | Aug. 7, 1924 |